United States Patent Office 2,948,713
Patented Aug. 9, 1960

2,948,713

METHOD OF PREPARING HIGH MOLECULAR WEIGHT LINEAR HYDROCARBON POLYMERS

Theodore Lemiszka, Rahway, and Stanley B. Mirviss and Isidor Kirshenbaum, Westfield, N.J., assignors to Esso Research and Engineering Company, a corporation of Delaware No Drawing. Filed July 5, 1957, Ser. No. 669,952

2 Claims. (Cl. 260—94.9)

The present invention relates to the polymerization of olefins. More particularly, the invention concerns the polymerization of lower hydrocarbon olefins in the presence of an organo-metal compound containing at least one branched hydrocarbon group.

Heretofore ti has been shown that ethylene and other olefins may be polymerized at relatively low pressures by employing combinations of organo-metallic compounds and various reducible heavy metal compounds, especially titanium halides. These catalysts yield a high molecular weight polymer which is essentially linear. However, previous attempts to prepare high molecular weight polymers with organo-metallic compounds alone have resulted in low molecular weight products.

It has now been discovered that high molecular weight olefins can be prepared in the presence of an organo-metallic compound containing at least one hydrocarbon group having a branch at the beta carbon. Because the polymerization, which results in high molecular weight polymer, can be carried out in the absence of any reducible metal component, it is believed that the mechanism involved in the present invention is entirely different from that described above. While it is not understood why this catalyst is effective when others are not, it is thought that the branched hydrocarbon group is essential.

According to the present invention, lower hydrocarbon alpha olefins, particularly alpha olefins containing 2 to 4 carbon atoms, are polymerized at a temperature ranging between —10 to 200° C. and under a pressure of 100 to 20,000 p.s.i.g., in the presence of a minor amount of an organo-metallic compound containing at least one hydrocarbon group having a branch at the beta carbon on said group. Suitable alpha olefins include ethylene, propylene and butene-1. The polymerization is allowed to proceed until the desired amount of high molecular weight polymer is produced.

If it is desired, the polymerization may be carried out in the presence of an inert hydrocarbon diluent, such as cyclohexane, benzene, hexane, white oil, naphthas, xylene, etc. The amount of diluent is not critical and may, therefore, vary between 0 and 95 wt. percent based on the catalyst. Where a diluent is employed, the catalyst concentration in the diluent should preferably be between about 15 and 80 wt. percent.

The organo-metallic compound which comprises the catalyst should contain a metal selected from those in group III(a) in the priodic table. The most effective metal is aluminum and for this reason it is especially preferred. The aluminum compound should contain three hydrocarbon radicals and at least one of these should be a branched hydrocarbon, such as isobutyl. The other two hydrocarbon groups may also be branched hydrocarbons or, if desired, may consist of normal hydrocarbons, aryl or cyclo paraffinic radicals. The preferred catalyst consists of a trialkyl aluminum wherein all of the alkyl groups are branched, in other words, a triisoalkyl aluminum compound. It is felt that it is necessary to have at least one of the branches of a hydrocarbon group attached to the beta carbon atom of said group, the alpha carbon atom being attached to the aluminum. Besides having the side chain attached to the beta position of the alkyl group, each branched hydrocarbon group should contain a total of no more than 9 carbon atoms, or less than 3, with from 1 up to 4 carbon atoms in the side chain attached to the beta carbon atom.

Among the branched hydrocarbon-containing aluminum compounds which are suitable for the purposes of the invention are ethyl diisobutyl aluminum, di-n-hexyl isobutyl aluminum, triisobutyl aluminum, tri-(2-ethylhexyl) aluminum, and tri-(2-methyl-pentyl) aluminum.

A preferred embodiment of the invention comprises polymerizing 100 parts by weight ethylene, which appears to be one of the most active olefins, with about 1 to 50 parts by weight of a triisoalkyl aluminum catalyst at a tempertaure of 10 to 150° C. for from a few minutes up to 250 hours under a pressure of 500 to 10,000 p.s.i.g. The amount of catalyst employed can vary within wide limits depending somewhat upon the purity of the olefin feed. If desired, the catalyst may be added in a solvent, say, a 15 to 80 wt. percent solution in an aliphatic or aromatic hydrocarbon solvent. It is also important to stress that the presence of oxygen-containing substances markedly interferes with the efficiency of the catalyst system. Therefore, the reactor should be flushed with an inert gas, such as nitrogen, to insure the substantial absence of oxygen and other oxygenated compounds.

Because the polymerization time is dependent upon the other conditions employed, it is important to employ optimum conditions in order to maintain the time of reaction within comercially feasible limits. By arranging the process in this manner it is possible to carry out the polymerization to a satisfactory degree within from about 1 to 50 hours.

Upon completion of the polymerization, the catalyst may be completely deactivated by the addition of an alcohol such as isopropyl alcohol or normal butyl alcohol, in amounts of about 10 to 100 times the quantity of catalyst employed. If desired, chelating agents, such as acetyl acetone, acetyl acetate, acetonyl acetone, etc., may be employed to obtain a very low ash-containing polymer. By these methods the ash residue in the polymer is generally reduced to below about 0.05 wt. percent.

The polymers produced by the above method are at least equal in quality to those produced by conventional low pressure polymerization processes already described. They are crystalline linear polymers melting between about 190 and 210° C. and having a Harris molecular weight of from 100,000 to 3,000,000, depending upon the conditions employed. The crystallinity of the polymers may be determined by X-ray measurements and infrared studies.

The polymers prepared according to this invention do not contain metals other than those in group III(a) in the periodic table, e.g., aluminum, as the sole ash metal. They generally contain about 0.02 to 0.002 wt. percent ash. The polymers may be used in numerous items, such as in structural material, coatings, insulators, fibers, etc.

This and other more specific aspects of the invention will be better understood by referring to the following specific example.

*Example*

A 50 wt. percent solution, consisting of 375 grams of triisobutyl aluminum in a white oil, having an SSU viscosity of 370 at 100° F. and 55 at 210° F. and consisting primarily of naphthenes and isoparaffins, was charged into a 2-liter bomb. Ethylene was pressured into the bomb until the total pressure was 1500 p.s.i.g. (total free volume ca. 10 liters). When the pressure had dropped to 1,000 p.s.i.g., the unreacted ethylene was vented off. The polyethylene was filtered off, washed with isopropyl alcohol, which contained some acetyl acetone, and this was followed by an acetone wash. The product was found to be essentially linear and to have a Harris molecular weight of about 1,000,000. X-ray and infrared measurements indicated it was crystalline and linear. A melting point determination showed it had a melting point of 197° C. An evaluation of the physical properties of the polyethylene recovered resulted in the finding that it had an ultimate tensile strength of 2200 p.s.i., and an elongation of 150%.

The invention is not limited to the specific figures of the foregoing example. The relative purposes of the materials used and the reaction conditions may be varied within the limits indicated in the specification to obtain polymers having varying characteristics.

What is claimed is:

1. The process of polymerizing ethylene which comprises intimately contacting the olefin with a catalyst consisting of a triisoalkyl aluminum compound in an inert hydrocarbon diluent, the catalyst concentration in the diluent being in the range of about 15 to 80 wt. percent, under a pressure of 500 to 10,000 p.s.i.g. at 10 to 150° C. until an essentially linear, solid polymer having a Harris molecular weight of 100,000 to 3,000,000 is recovered.

2. A process according to claim 1 in which the alkyl aluminum compound is triisobutyl aluminum.

References Cited in the file of this patent

UNITED STATES PATENTS

| | | |
|---|---|---|
| 2,699,457 | Ziegler | Jan. 11, 1955 |
| 2,827,455 | Bartolomeo | Mar. 18, 1958 |

FOREIGN PATENTS

| | | |
|---|---|---|
| 533,362 | Belgium | May 16, 1955 |

OTHER REFERENCES

Angew, Chem. 64, 323–329 (1952).
Brennstoff: Chem. 33, 193–200 (1952).
Chem. Reviews, 58 No. 3, 542–544, 579, 580 (1958).